(12) United States Patent
Qian et al.

(10) Patent No.: US 8,954,556 B2
(45) Date of Patent: Feb. 10, 2015

(54) UTILITY-BASED MODEL FOR CACHING PROGRAMS IN A CONTENT DELIVERY NETWORK

(75) Inventors: Yuhui Qian, Lexington, MA (US); Xuefeng Yao, Weston, MA (US); Zhiying Jin, Lexington, MA (US); Jack Jianxiu Hao, Lexington, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 235 days.

(21) Appl. No.: 13/308,872

(22) Filed: Dec. 1, 2011

(65) Prior Publication Data
US 2013/0145001 A1 Jun. 6, 2013

(51) Int. Cl.
*G06F 15/16* (2006.01)

(52) U.S. Cl.
USPC .... 709/223; 709/217; 707/736; 707/E17.119; 711/118; 711/133

(58) Field of Classification Search
CPC .............. H04L 67/1008; H04L 67/289; H04L 67/2842; H04L 67/2847; H04L 67/2852; H04L 67/2857; G06F 17/3053
USPC .......... 709/223–226, 220, 217–219; 711/118, 711/133–136; 707/736, E17.119, E17.12, 707/E17.121
See application file for complete search history.

(56) References Cited

U.S. PATENT DOCUMENTS

| | | | |
|---|---|---|---|
| 7,028,096 B1 * | 4/2006 | Lee ................................ | 709/231 |
| 2005/0210530 A1 * | 9/2005 | Horvitz et al. ................ | 725/134 |
| 2009/0049247 A1 * | 2/2009 | Henshaw et al. ............. | 711/118 |
| 2009/0100224 A1 * | 4/2009 | Wang ............................ | 711/118 |
| 2010/0094833 A1 * | 4/2010 | Svendsen ...................... | 707/705 |
| 2010/0250710 A1 * | 9/2010 | Cadwell et al. ............... | 709/219 |
| 2011/0107030 A1 * | 5/2011 | Borst et al. ................... | 711/118 |
| 2011/0264731 A1 * | 10/2011 | Knowles et al. ............. | 709/203 |
| 2012/0005251 A1 * | 1/2012 | Xie et al. ...................... | 709/201 |
| 2012/0124159 A1 * | 5/2012 | Takahashi ..................... | 709/213 |
| 2012/0137336 A1 * | 5/2012 | Applegate et al. ............. | 725/95 |
| 2012/0158815 A1 * | 6/2012 | Kelly et al. ................... | 709/201 |

* cited by examiner

*Primary Examiner* — Liangche A Wang
*Assistant Examiner* — Abdulkader M Alriyashi

(57) ABSTRACT

Methods, devices, and storage media for receiving one or more utility preferences that indicate one or more criteria for measuring one or more utilities of programs; calculating utility solutions for the programs based on the one or more utility preferences; selecting one or more programs to store for at least one of downloading or streaming based on the utility solutions; and storing the one or more programs for downloading or streaming to users.

20 Claims, 7 Drawing Sheets

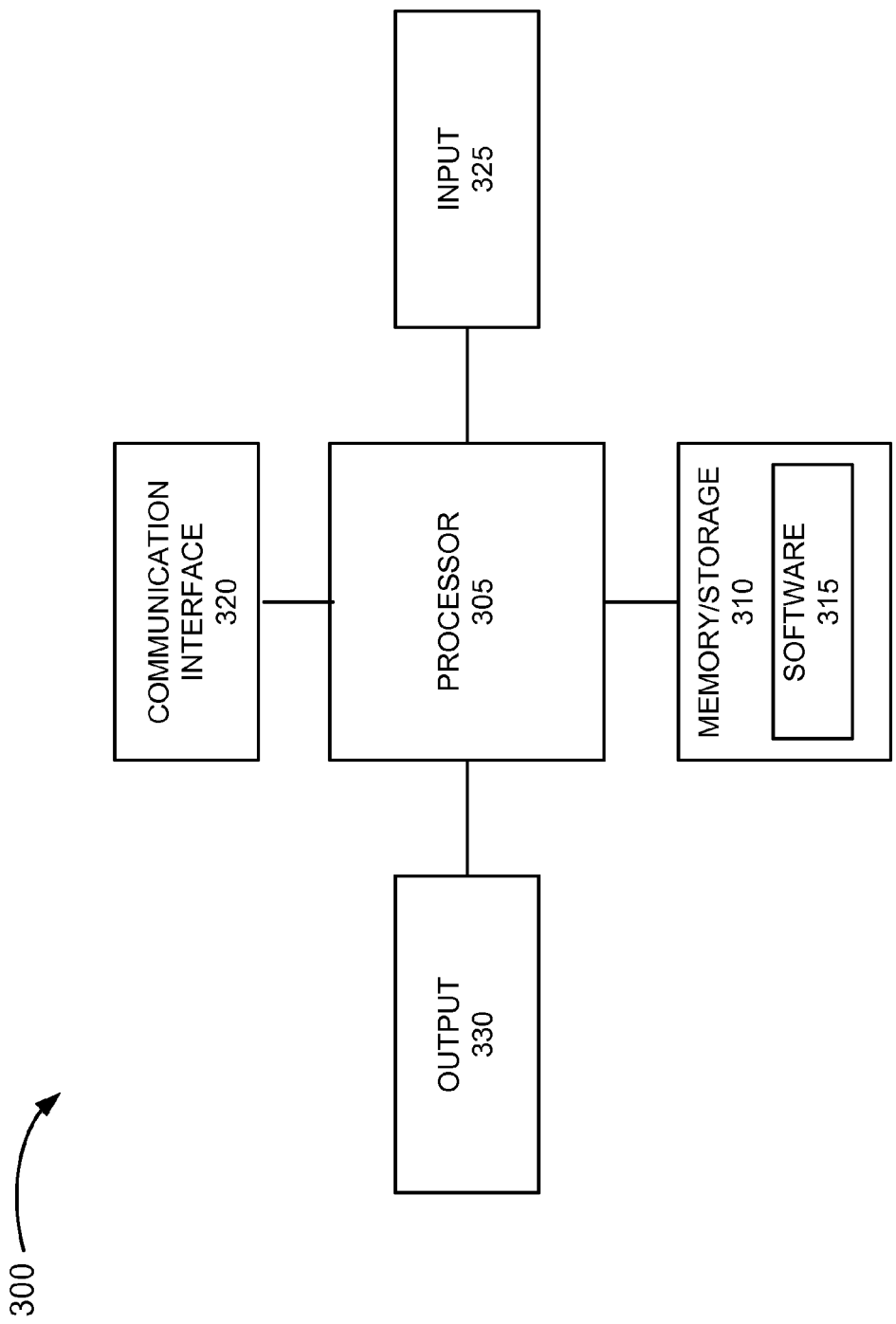

UTILITY-BASED MODEL FOR CACHING PROGRAMS IN A CONTENT DELIVERY NETWORK

BACKGROUND

Streaming and downloading of programs is a popular delivery mechanism for providing programs to users. A content delivery network (CDN) (also known as a content distribution network) is typically used for streaming and/or downloading programs. The content delivery network includes an origin server that stores programs and services edge servers. The edge servers cache programs and stream and/or download the programs to users.

BRIEF DESCRIPTION OF THE DRAWINGS

FIG. 3 is a diagram illustrating exemplary components of a device that may correspond to one or more of the devices in an exemplary environment.

DETAILED DESCRIPTION

The following detailed description refers to the accompanying drawings. The same reference numbers in different drawings may identify the same or similar elements. Also, the following detailed description does not limit the invention.

The term "program," as used herein, includes linear content, such as live television (e.g., a local program, a national program, a sitcom, a movie, a sporting event, a news program, etc.), or on-demand content (e.g., an on-demand program, a pay-per-view program, etc.). The downloading and/or streaming of a program may include dividing the program into segments. In this regard, when referring to a program in this description, the program may be considered the entire program or a portion of the program (e.g., one or more segments of the program).

Typically, edge servers use a simple stateless approach to cache programs, and only swap out old programs when the available disk space runs below a threshold. The edge servers may use a Least Recently Used (LRU) algorithm or a Least Frequently Used (LFU) algorithm for selecting programs to swap.

The caching of programs on an edge server can occur either before or after a user requests the program. Ideally, the edge server should always store any program that the user requests in order to reduce delay, etc., and provide optimal playback quality. However, in reality, as on-demand streaming and downloading requests increase and the number of programs available increase, the edge server can only host a subset of the programs due to resource constraints.

According to an exemplary embodiment, an edge server network dynamically manages the programs cached based on a utility-based model. The utility-based model is based on constraints and heuristics pertaining to streaming and/or downloading service(s). According to an exemplary implementation, hard constraints and soft constraints may be used. For example, hard constraints may include physical constraints (e.g., storage space, bandwidth, etc.). Soft constraints may include user preferences. Additionally, heuristic techniques may be used to evaluate a utility solution.

Figure 1:
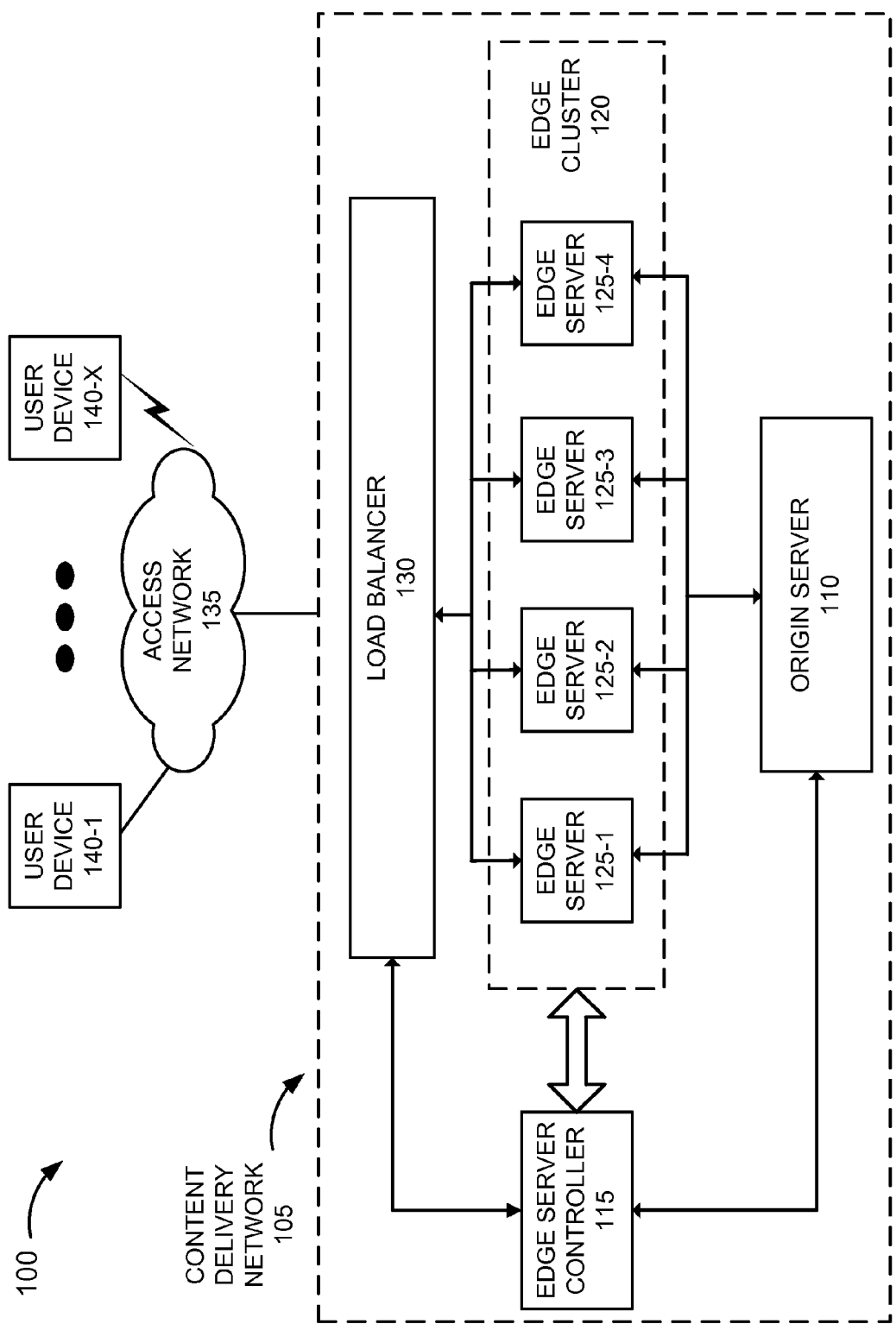
FIG. 1 is a diagram illustrating an exemplary environment in which an exemplary embodiment of a network device that manages the caching of programs based on a utility-based model may be implemented.

FIG. 1 is a diagram illustrating an exemplary environment in which an exemplary embodiment of a network device that manages the caching of programs based on a utility-based model may be implemented. As illustrated, environment 100 includes a content delivery network 105 that includes an origin server 110, an edge server controller 115, an edge cluster 120 including edge servers 125-1 through 125-4 (referred to collectively as edge servers 125 or individually as edge server 125), a load balancer 130, an access network 135, and user devices 140-1 through 140-X (referred to collectively as user devices 140 and individually as user device 140).

The number of devices and the configuration in environment 100 are exemplary and provided for simplicity. According to other embodiments, environment 100 may include additional devices, fewer devices, different devices, and/or differently arranged devices, than those illustrated in FIG. 1. For example, according to other embodiments, environment 100 may not include edge server controller 115.

According to other embodiments, a single device in FIG. 1 may be implemented as multiple devices and/or multiple devices may be implemented as a single device. For example, origin server 110 and edge server controller 115 may be implemented as a single device. A device may be implemented according to a centralized computing architecture, a distributed computing architecture, or a cloud computing architecture. Additionally, a device may be implemented according to one or multiple network architectures (e.g., a client device, a server device, a peer device, or a combination thereof).

According to other embodiments, environment 100 may include additional networks, fewer networks, and/or different networks than those illustrated and/or described in reference to FIG. 1. For example, environment 100 may include other types of network(s), such as the Internet, etc.

Also, according to other embodiments, one or more functions and/or processes described as being performed by a particular device may be performed by a different device, or some combination of devices. Environment 100 may be implemented to include wired and/or wireless connections among the devices illustrated.

Content delivery network 105 includes a network that provides a downloading and/or a streaming service of programs. Content delivery network 105 may support single bit rate streaming/downloading and/or multi-bit rate streaming/downloading. Content delivery network 105 may be implemented to support smooth streaming, dynamic streaming, and/or adaptive bitrate streaming. Content delivery network 105 may support various protocols, such as, Real Time Streaming Protocol (RTSP), Real Time Messaging Protocol (RTMP), Hypertext Transfer Protocol (HTTP), Microsoft Media Services (MMS) protocol, etc.

Origin server 110 includes a network device that stores programs to be downloaded and/or streamed to users. For example, origin server 110 may be implemented as a computational device (e.g., a computer, etc.), a server (e.g., a Web server, an application server, etc.), and/or other suitable network device. According to an exemplary embodiment, origin server 110 provides programs to edge servers 125 for caching. According to an exemplary implementation, origin server 110 provides programs to edge servers 125 based on communications with edge server controller 115. According to another implementation, origin server 110 provides programs to edge servers 125 based on requests from edge servers 125.

Edge server controller 115 includes a network device that manages edge cluster 120 (e.g., edge servers 125). For example, edge server controller 115 may be implemented as a computational device (e.g., a computer, etc.), a server (e.g., a Web server, an application server, etc.), and/or other suitable network device. According to an exemplary embodiment, edge server controller 115 manages the caching of programs on behalf of edge servers 125 based on the utility-based model described herein. According to an exemplary implementation, edge server controller 115 obtains statistical information pertaining to edge servers 125 and manages the caching of programs by edge servers 125 with origin server 110. According to other embodiments, the managing of programs cached is performed without edge server controller 115. For example, each edge server 125 manages its own caching of programs based on the utility-based model described herein. According to an exemplary implementation, edge servers 115 exchange state information, statistical information, etc., to manage the caching of programs. For example, edge servers 125 may perform some form of collaborative caching.

Edge server 125 includes a network device that caches programs and services streaming and/or downloading requests. For example, edge server 125 may be implemented as a computational device (e.g., a computer, etc.), a server (e.g., a Web server, an application server, etc.), and/or other suitable network device. According to an exemplary embodiment, edge server 125 manages the caching of programs based on the utility-based model described herein.

Load balancer 130 includes a network device that distributes workload across edge servers 125 of edge cluster 120. For example, load balancer 130 may be implemented as a computational device (e.g., a computer, etc.), a server (e.g., a Web server, etc.), a routing device, and/or other suitable network device. According to an exemplary implementation, load balancer 130 distributes the load pertaining to user requests of programs in an equally distributed fashion. According to another exemplary implementation, load balancer 130 distributes the load based on other well-known criteria.

Access network 135 includes a wired network and/or a wireless network that provides access, directly or indirectly, to content delivery network 105. For example, access network 135 may be implemented as a mobile network, a public network, a private network, a wide area network, a local area network, and/or a packet-switched network.

User device 140 includes a mobile device, a portable device, or a stationary device. For example, user device 140 may be implemented as a smartphone, a tablet device, a handheld device, a personal digital assistant (PDA), a palmtop device, a laptop computer, a desktop computer, a netbook, a gaming device, or a vehicular communication system (e.g., in a car, etc.). User device 140 is capable of downloading or streaming a program.

According to an exemplary embodiment, the cache management of programs associated with edge servers 125 is a proactive approach. This is in contrast to conventional approaches in which particular programs are stored and passively swapped out based on, for example, LRU or LFU algorithms. The proactive management approach, as described herein, may provide an improved viewing experience for users (e.g., lower latency, higher bitrates, etc.) and more efficient edge server usage.

As previously described, the utility-based model is based on constraints. According to an exemplary implementation, a constraint may be considered a hard constraint or a soft constraint. According to other implementations, other types or categories of constraints may be used (e.g., a flexible constraint, a conditional constraint, etc.). A hard constraint may be a specific factor that cannot be violated. The hard constraint may include one or multiple values pertaining to a specific factor (e.g., an upper bound, a lower bound, etc.). Described below are examples of hard constraints pertaining to program cache management.

Network resources are examples of hard constraints. For example, the total storage associated with edge server 125 or any network device in content delivery network 105 is limited. As a result, there are a limited number of programs, etc., that may be stored. Another example of a hard constraint is available bandwidth. For example, there is a bandwidth limitation to/from origin server 110 and edge servers 125, or between other network devices in content delivery network 105. Additionally, there are other types of hard constraints, such as processor limitations, number of connections that can be managed at one time, etc., which pertain to the network devices in content delivery network 105.

In addition to physical constraints, such as network resources, according to an exemplary implementation, hard constraints may pertain to the programs. For example, an operator or a service provider associated with content delivery network 105 may specify, as a hard constraint, that a particular program be cached. As an example, a hard constraint may indicate that a program (e.g., a sporting event (e.g., the Super Bowl game, the World Series, etc.), a live event pertaining to a popular news issue (e.g., a jury verdict, etc.), etc.) is cached for a particular time period and will not be removed or swapped out regardless of other conditions.

A soft constraint may be a specific factor without definite limitation. As an example, a soft constraint may be implemented as a user preference (e.g., manually input, based on history data, etc.). Described below are examples of soft constraints pertaining to program caching management in content delivery network 105.

As an example, the operator or the service provider may prefer to manage the cache partially based on previous access history. For example, segments of a program that have been frequently accessed in the past have a likelihood of being frequently accessed in the future. The soft constraint may give preference to programs for caching over other programs based on their previous access history.

According to another example, certain types or categories of programs may be given preference over other types or categories of programs. By way of example, it may be preferred to have more children's movies and television shows cached during Saturday morning since that is typically the timeframe with more children viewers. Therefore, if this preference is enabled, these types or categories of programs may be preloaded and cached by edge server(s) 125. Additionally, it may be preferred to have these programs be of a higher bitrate version for caching to provide a better viewing experience than the lower bitrate versions of these programs and/or other programs cached.

According to another example, in the case when both storage space and bandwidth become limited relative to edge server(s) 125, and if the soft constraint is to provide smooth service (e.g., low latency) to most of the users, the soft constraint may specify that more low bitrate versions of programs be cached and throttle the caching and transmitting of high bitrate versions of the programs. This may be performed even if some users have requested high bitrate versions and/or have a high bandwidth network connection with edge server 125.

According to yet another example, in an edge cluster (e.g., edge cluster 120), a soft constraint may specify that each program be cached on a single edge server 125 or multiple edge servers 125. Additionally, for example, the determination of whether to cache a program on a single edge server 125 or multiple edge servers 125 may be based on another soft constraint. For example, the soft constraint may specify that a particular program be preloaded by multiple edge servers 125 if the requests in the past hour exceed a particular threshold.

In order to select the best solution for caching programs (e.g., the entire program, a segment of the program, etc.) by edge servers 125 at any instance in time, possible solutions may be compared to each other. The selection of a solution may cause, for example, a pre-loading of a program to edge server 125, a removing of a program from edge server 125, continuing to cache a program by edge server 125, caching a program on a single edge server 125, or caching the program on multiple edge servers 125. Additionally, only solutions that do not violate any hard constraints will be considered as valid solutions.

According to an exemplary embodiment, the best solution(s) will be selected based on a quantitative measurement of the solution. According to an exemplary implementation, a quantitative measurement is based on utility theory. The idea of utility theory is to score criteria based on a user's particular preference and generate a global utility based on the priority of these preferences. An exemplary utility equation is provided below:

$$U = \sum_{i=1}^{n} w_i U(Q_i), \quad (1)$$

in which U represents the overall utility of the solution, $U(Q_i)$ represents the utility of a particular preference, and $w_i$ represents the weight (or importance) of a particular preference. The variables $U(Q_i)$ and $w_i$ may be normalized in order to make comparisons between solutions. For example, $U(Q_i)$ may be normalized as $U(Q_i) \in [0, 100]$ and $w_i$ may be normalized as $$\sum_{i=1}^{n} w_i = 1.$$

Thus, $U \in [0, 100]$.

According to an exemplary embodiment, the utility equation is applied to a program (i.e., the entire program or one or more segments of the program). For example, according to an exemplary implementation, the utility equation is applied to all programs stored by origin server 110 as a basis for determining which programs are cached by edge servers 125. According to another exemplary implementation, the utility equation is applied to each segment of a program. According to yet another exemplary implementation, the utility equation may be applied to only a portion of programs and/or segments regardless of where the programs or the segments are stored (e.g., edge server 125, origin server 110).

As expressed above in equation (1), $U(Q_i)$ represents the utility of a particular preference. There are numerous preferences that may be applied to the utility equation. For example, a preference may be directed to past viewing history, particular categories of programs, particular programs (e.g., selected based on the season, holiday, current events, etc.), bitrates pertaining to the programs, time (e.g., time of day, day of week, etc.), cache as many different programs as possible, length of programs, location of edge server, caching on multiple edge servers, caching programs similar to popular programs, caching programs based on what is currently playing at the movie theaters, a percentage of the program that needs to be cached, cache only recent or new programs, combinations thereof, etc. In this regard, there is an expansive array of preferences that may be used for the utility equation depending on the needs of, for example, the operator or the provider. Given the expansive nature of preferences available, other preferences not specifically mentioned herein may be implemented. A further description is provided below pertaining to some of the exemplary preferences that may be used as a utility preference $U(Q_i)$.

According to one example, assume that $U(Q_1)$ is the utility of a previous viewing history preference. According to an exemplary implementation, $U(Q_1)$ may be modeled by comparing the total number of times a program is accessed within a time period (e.g., in the past ten minutes) to an upper bound range. For example, assume that a first program is divided into 50 segments. Also, assume that previous access history information indicates that the collection of segments is accessed, during the past ten minutes, 12,500 times or on average 250 times for each segment. Additionally, assume that in most cases for programs, the lower and the upper bound range of access during a ten minute period is between 0 and 500 times per segment. According to this example, the value of $U(Q_1)$ for the first program can be normalized to $(250/500)*100=50$. If a second program has an average per segment access of 300 times, then $U(Q_1)$ for the second program can be normalized to $(300/500)*100=60$. In the event that a lower bound and an upper bound are not available, the lower and upper bounds may be arbitrarily assigned as a basis for normalization. If $U(Q_i)$ has a value greater than 100, then the value of $U(Q_i)$ will be reduced to 100 for normalization purposes.

As expressed above in equation (1), each preference is assigned a weight w. Continuing with this example, it may be assumed that $w_1=50\%$. In this regard, previous viewing history is considered an important factor pertaining to the overall utility U of the solution. Thus, for the first program, the previous viewing history will contribute $50\%*50=25$ toward the overall utility U, and for the second program, the previous viewing history will contribute $50\%*60=30$ toward the overall utility U.

A similar approach may be applied to other preferences. For example, assume that $U(Q_2)$ represents the utility of a preference for having more children's programs being cached. According to an exemplary implementation, the value of $U(Q_2)$ may have a value of 0 or 100, since this preference is essentially a binary feature. If the weight $w_2=25\%$, then the contribution of $U(Q_2)$ toward the overall utility U will be either 25 or 0.

According to the above example, a particular preference affords a program (e.g., a children's program) a significantly greater utility than another program (e.g., an adult program), which is afforded no utility for this particular preference. Depending on the circumstances, this may be desirable. Alternatively, when multiple preferences are applied to calculate an overall utility U, the value of w, assigned to each preference may be used to temper the overall utility U for the programs being evaluated. According to an exemplary implementation, the value of $w_i$ may have a value between 0 and 1. In other words, $$\sum_{i=1}^{n} w_i = 1,$$

as previously described.

Theoretically, if an overall utility U for every possible solution is calculated, the best combination of programs to be cached by edge servers 125 for each update will be discovered. However, the number of possible combinations creates an exponential growth problem and may be characterized as a non-deterministic polynomial time (NP)-complete problem. Also, the update frequency relative to the evaluation time should be structured that the time it takes to calculate the overall utilities U and select the optimal solution(s) should be significantly less than the update frequency interval.

According to an exemplary embodiment, the utility-based model, as described herein, includes using heuristics to significantly reduce the search space/time problem and provide a basis for selecting solutions that are satisfactory. For example, according to an exemplary implementation, the utility-based model may be considered as a constraint satisfaction problem (CSP) or some derivative thereof (e.g., flexible CSP using flexible constraints, etc.). Thus, well-known techniques and heuristics commonly used for constraint satisfaction problem solving or derivative CSP solving may be applied.

According to an exemplary implementation, the preference $U(Q_i)$ and its corresponding weight $w_i$ may be used to direct the search and solution construction. For example, if the frequency of previous viewing is one of the preferences, and this preference is assigned a high weight relative to other preferences, the selection and/or ranking of programs for caching may include sorting programs based on their previous viewing frequency score. According to this approach, the assumption is that programs that score well relative to this preference are likely to be selected as the optimal solution (e.g., having the highest overall utility U).

Continuing with this approach, sorting (e.g., pre-sorting) candidate programs may yield a certain degree of optimization during the early evaluation stage. This may be useful when the evaluation time period is small and/or the search space is large. According to an exemplary implementation, candidate programs (e.g., a portion of the entire inventory of programs or the entire inventory of programs) may be pre-sorted based one or more preferences. For example, a pre-sorting process may be performed as an offline batch process (e.g., due to the number of programs). Alternatively, a pre-sorting process may be performed on-line based on real-time statistics to permit dynamic updating of the programs cached.

Subsequent to the pre-sorting, or simultaneously, a search and an assembly process of the utility solutions may be performed in which top-ranked programs from each preference sort are combined, and their percentage based on the weight of the preferences are adjusted, thus reducing the search space and increasing the problem solving efficiency dramatically.

According to an exemplary implementation, program cache management includes determining which programs should persist or remain cached on edge server(s) 125 and which programs should be pre-loaded on edge server(s) 125. According to such an implementation, to help predict the popularity of a program, and assist in determining whether all segments of a program or only a portion of the program should be pre-loaded, and what bitrates should be pre-loaded, edge servers 125 may pre-cache the initial part of a program for most programs. Based on the access statistics associated with these programs, this information can serve as a basis for predictive further access and guide the proactive caching of programs.

According to an exemplary embodiment, edge servers 125 and the program cache management are stateless. That is, edge server controller 115 and edge servers 125 do not have knowledge about the end user. According to another exemplary embodiment, end-user knowledge may be used for managing the caching of programs. For example, edge server controller 115 or edge servers 125 may use user-specific preferences to cache programs. For example, a very important person (VIP) user or a user group will have their requested programs available on edge server 125 to provide an optimal viewing experience. For example, particular programs and/or a particular category of programs may be available on edge server 125 most of the time to cater to a preferred user. The user-specific preferences may also govern other aspects pertaining to the programs cached (e.g., bitrate of programs, length of programs etc.). The user-specific preferences may also indicate user location information and/or user schedule information of the user so that content delivery network 105 caches programs on suitable edge servers 125. As an example, a user may travel to work during the week and has a 30 minute communicate from point A to point B. The user may indicate user-specific preferences as to locations (e.g., point A, point B), length of programs (e.g., 30 minutes), bitrate of programs (e.g., high), category of programs, and/or particular programs to be cached. Content delivery network 105 (e.g., edge server controller 115, edge server 125, etc.) may store the user preference information.

Figure 2A:
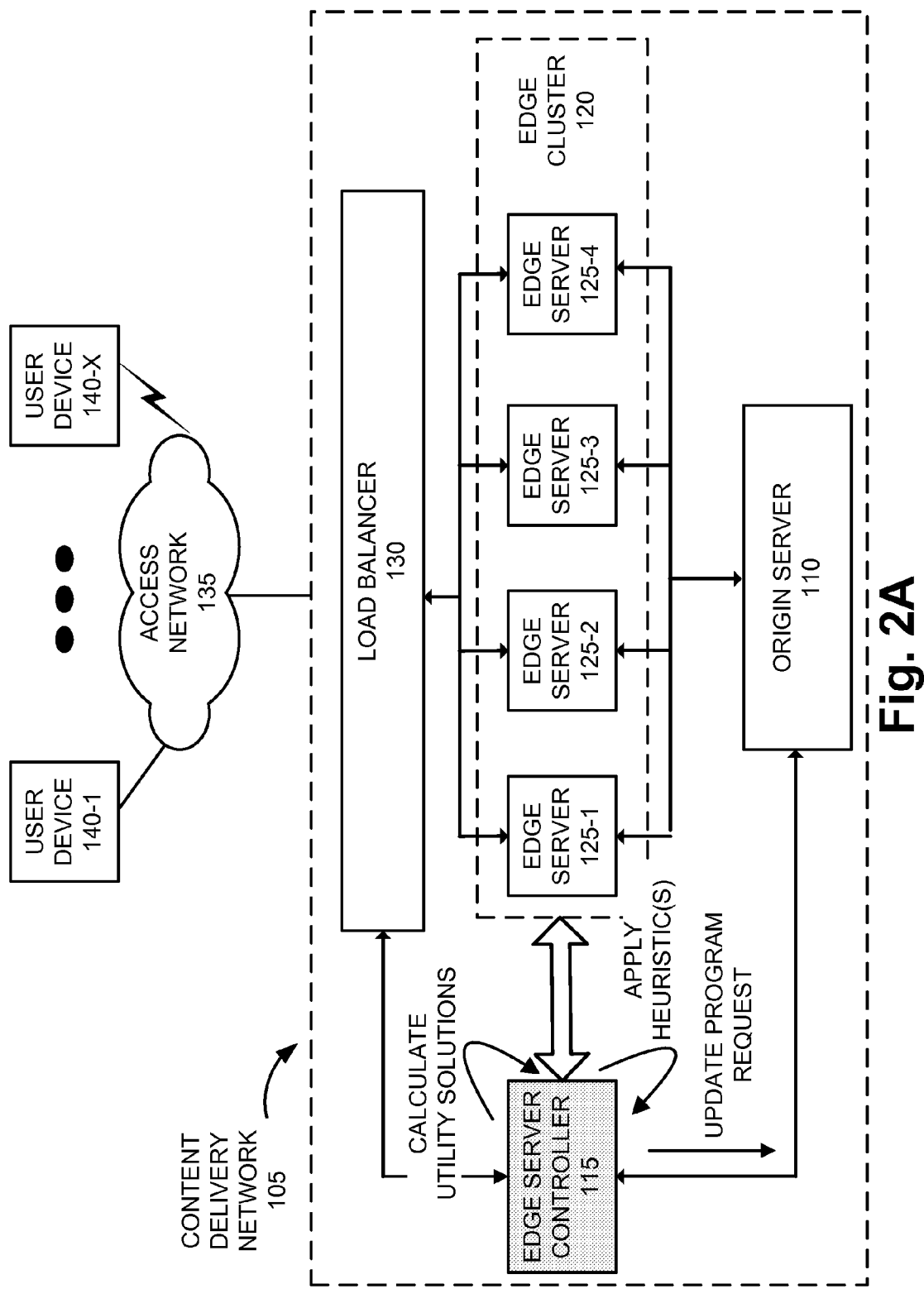
FIGS. 2A-2D illustrate an exemplary process for managing the caching of programs based on the utility model in a content delivery network.
Figure 2B:
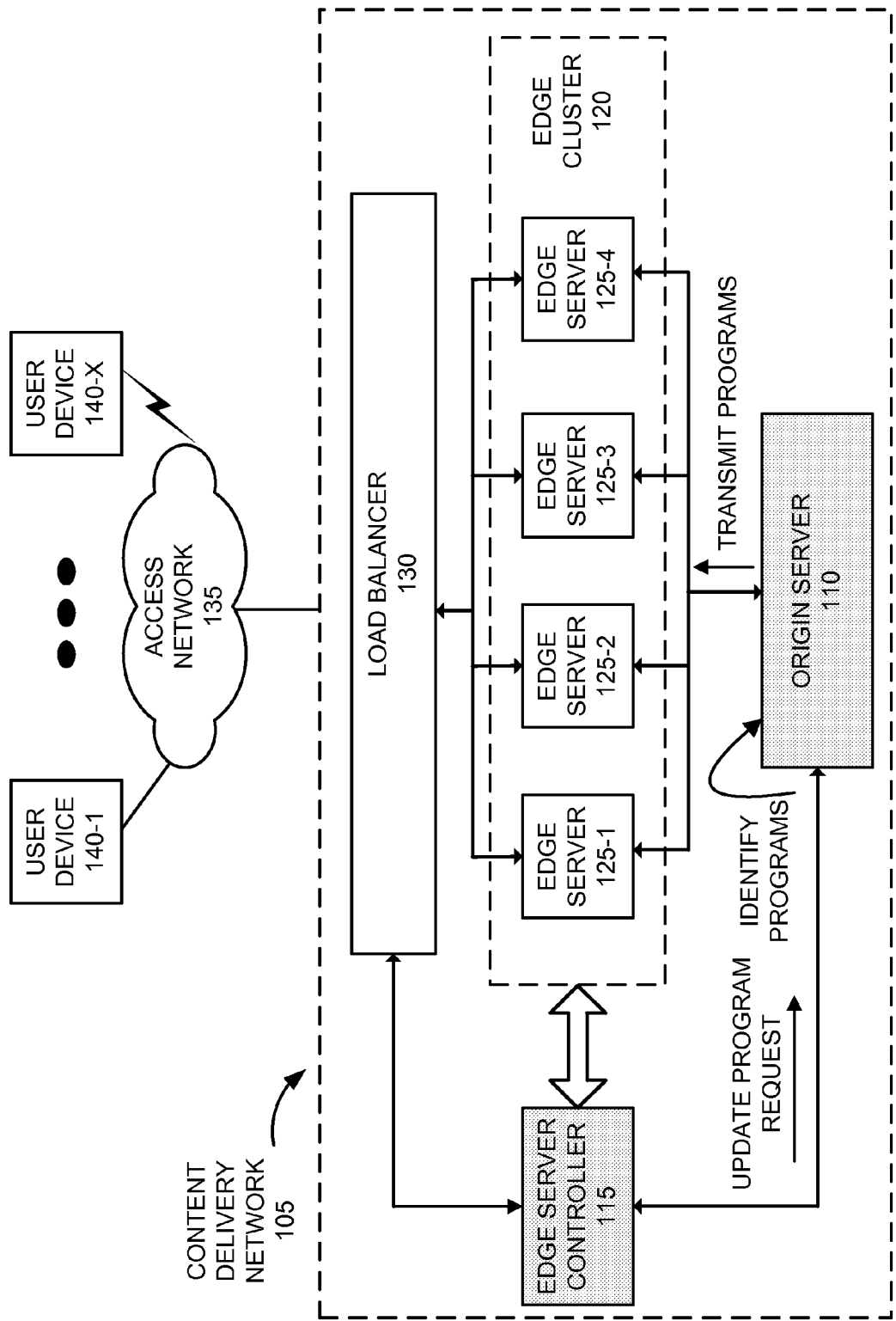
Figure 2C:
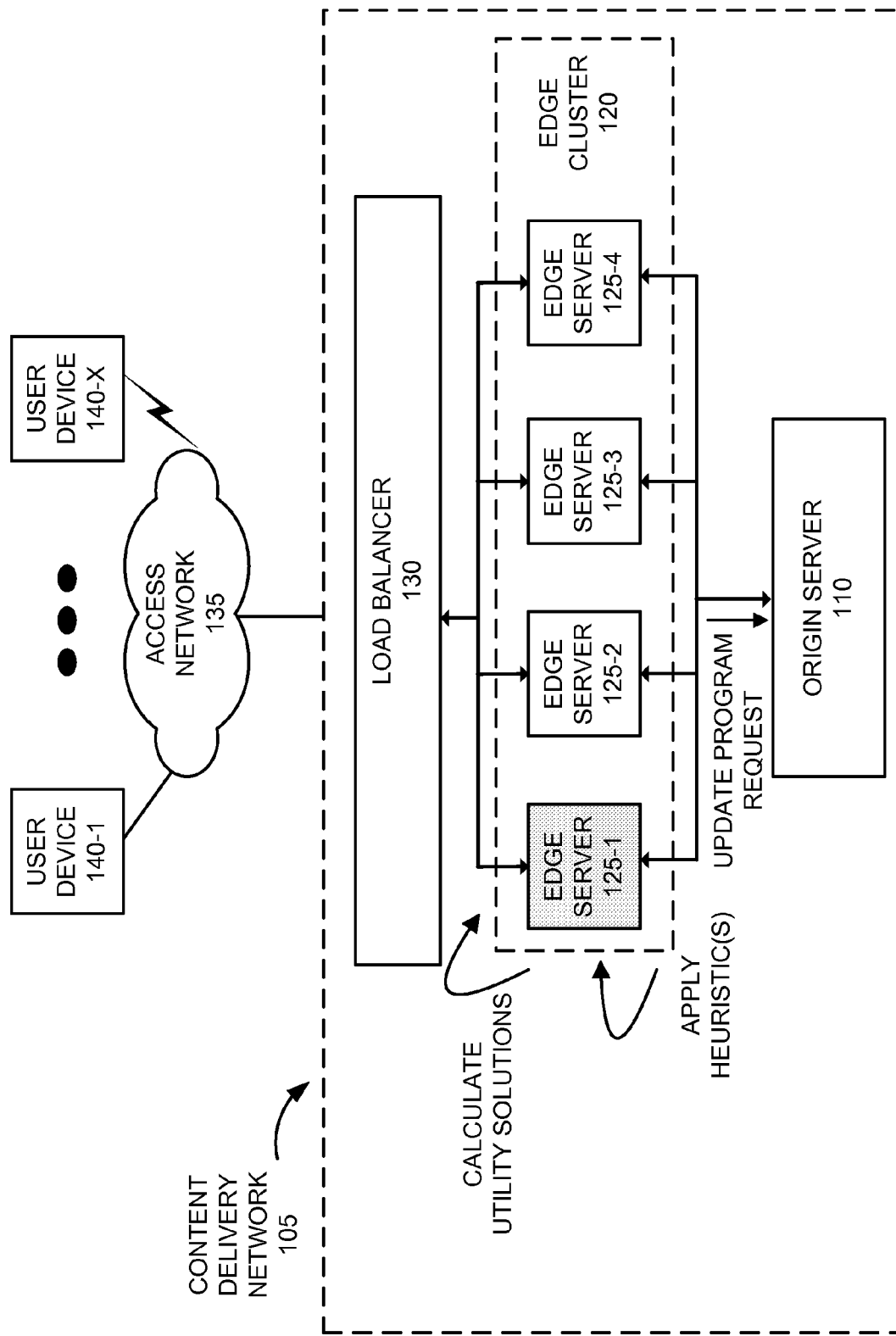
Figure 2D:
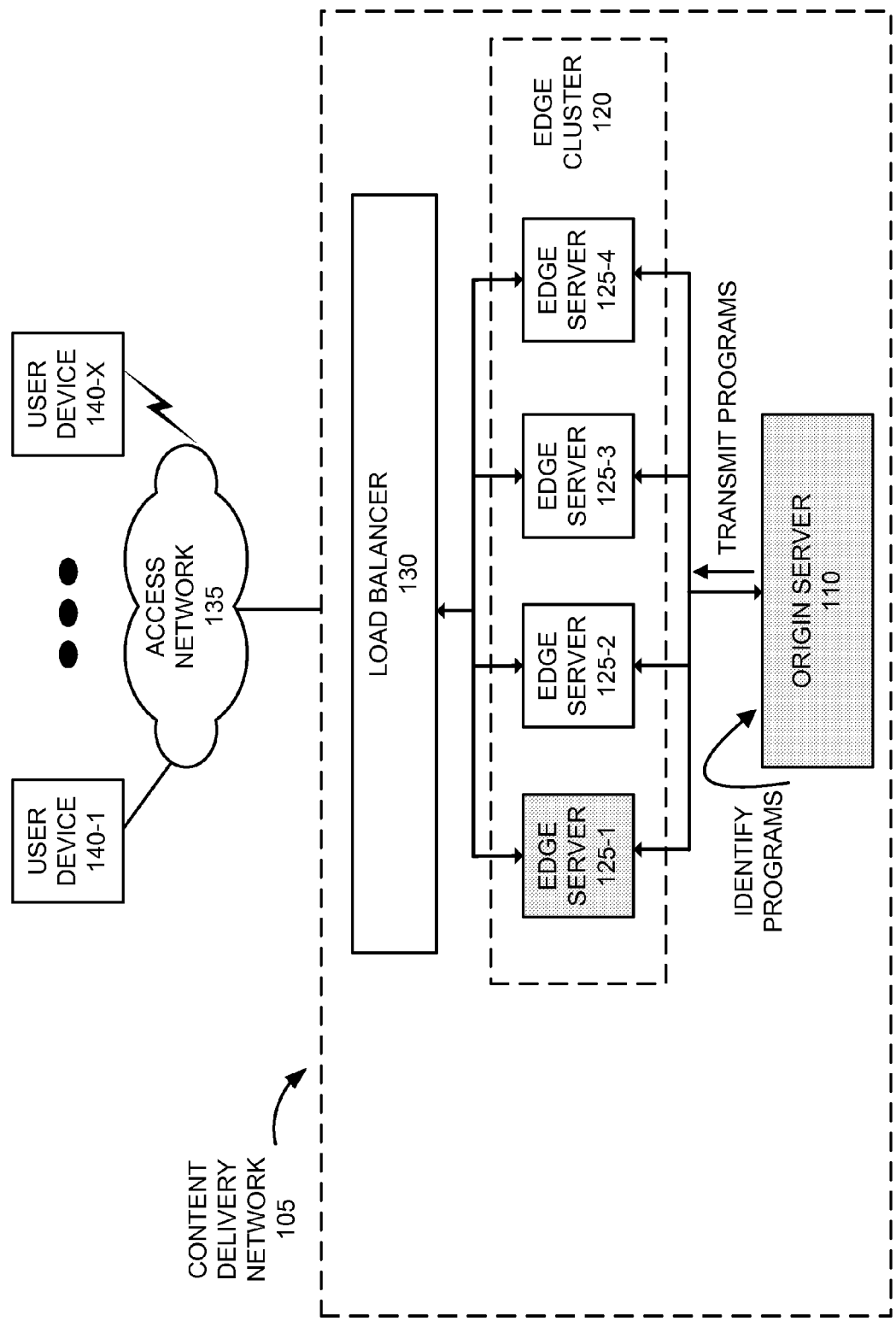

FIGS. 2A-2D illustrate an exemplary process for managing the caching of programs based on the utility model in content delivery network 105. FIGS. 2A and 2B illustrate an exemplary process in which content delivery network 105 includes edge server controller 115. FIGS. 2C and 2D illustrate an exemplary process in which content delivery network 105 does not include edge server controller 115.

According to an exemplary embodiment, the updating of programs cached by edge cluster 120 (e.g., one or more of edge servers 125) is a proactive management approach. According to an exemplary implementation, it may be assumed that edge server controller 115 includes a utility equation algorithm (e.g., software) that calculates utility solutions pertaining to a set of programs and selects the programs to be cached. According to an exemplary implementation, edge server controller 115 or another network device (not illustrated) stores program identifiers and metadata (e.g., title, genre, etc.) pertaining to each program. According to an exemplary implementation, edge server controller 115 or another network device stores state information (e.g., what programs are stored, etc.) pertaining to each edge server 125.

Referring to FIG. 2A, edge server controller 115 calculates utility solutions (e.g., based on equation (1)) for a set of programs. In some instances, edge server controller 115 may use statistical information obtained from edge cluster 120 and/or state information when calculating the utility solutions. Edge server controller 115 applies one or more heuristics, as previously described. Edge server controller 115 selects program(s) that are to be cached by one or multiple edge servers 125 of edge cluster 120. Edge server controller 115 generates an update program request that includes the selected programs. Edge server controller 115 transmits the update program request to origin server 110.

Referring to FIG. 2B, origin server 110 receives the update program request. Origin server 110 identifies the programs identifiers included in the update program request. Origin server 110 transmits the programs associated with the program identifiers to edge cluster 120. One or more edge servers 125 update their cache of programs.

Referring to FIG. 2C, and according to an exemplary implementation, each edge server 125 manages its own caching of programs. Edge servers 125 may share, for example, statistical and/or state information among each other. As illustrated, an edge server (e.g., edge server 125-1) calculates utility solutions (e.g., based on equation (1)) for a set of programs. In some instances, edge server 125-1 may use statistical information obtained from other edge servers 125 and/or state information when calculating the utility solutions. Edge server 125-1 applies one or more heuristics. Edge server 125 selects program(s) that are to be cached. Edge server 125 generates an update program request that includes the selected programs and transmits the update request to origin server 110. Referring to FIG. 2D and in a manner similar to that previously described in FIG. 2B, origin server 110 identifies the programs and transmits the programs to edge server 125-1. Edge server 125-1 updates its cache of programs.

FIG. 3 is a diagram illustrating exemplary components of a device 300 that may correspond to one or more of the devices in environment 100. As illustrated, according to an exemplary embodiment, device 300 includes a processor 305, memory/storage 310 storing software 315, a communication interface 320, an input 325, and an output 330. According to other embodiments, device 300 may include fewer components, additional components, different components, and/or a different arrangement of components than those illustrated in FIG. 3 and described herein.

Processor 305 includes one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (e.g., one or multiple cores), microcontrollers, and/or some other type of component that interprets and/or executes instructions and/or data. Processor 305 may be implemented as hardware (e.g., a microprocessor, etc.), a combination of hardware and software (e.g., a SoC, an ASIC, etc.), may include one or multiple memories (e.g., memory/storage 310), etc.

Processor 305 may control the overall operation or a portion of operation(s) performed by device 300. Processor 305 may perform one or multiple operations based on an operating system and/or various applications or programs (e.g., software 315). Processor 305 may access instructions from memory/storage 310, from other components of device 300, and/or from a source external to device 300 (e.g., a network, another device, etc.).

Memory/storage 310 includes one or multiple memories and/or one or multiple other types of storage mediums. For example, memory/storage 310 may include one or multiple types of memories, such as, random access memory (RAM), dynamic random access memory (DRAM), cache, read only memory (ROM), a programmable read only memory (PROM), a static random access memory (SRAM), a single in-line memory module (SIMM), a phase-change memory (PCM), a dual in-line memory module (DIMM), a flash memory, and/or some other type of memory. Memory/storage 310 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 310 may include drives for reading from and writing to the storage medium.

Memory/storage 310 may be external to and/or removable from device 300, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray® disk (BD), etc.). Memory/storage 310 may store data, software, and/or instructions related to the operation of device 300.

Software 315 includes an application or a program that provides a function and/or a process. Software 315 may include firmware. Communication interface 320 may permit device 300 to communicate with other devices, networks, systems, etc. Communication interface 320 may include one or multiple wireless interfaces and/or wired interfaces. Communication interface 320 may include one or multiple transmitters, receivers, and/or transceivers. Communication interface 320 may operate according to one or multiple protocols, standards, and/or the like.

Input 325 may permit an input into device 300. For example, input 325 may include a keyboard, a mouse, a display, a touchscreen, a touchless screen, a button, a switch, an input port, speech recognition logic, and/or some other type of visual, auditory, tactile, etc., input component. Output 330 may permit an output from device 300. For example, output 330 may include a speaker, a display, a touchscreen, a touchless screen, a light, an output port, and/or some other type of visual, auditory, tactile, etc., output component.

Device 300 may perform processes and/or functions, as described herein, in response to processor 305 executing software 315 stored by memory/storage 310. By way of example, the instructions may be read into memory/storage 310 from another memory/storage 310 or from another device via communication interface 320. The instructions stored by memory/storage 310 may cause processor 305 to perform one or more processes described herein. Alternatively, for example, according to other implementations, device 300 may perform one or more processes described herein based on the execution of hardware (processor 305, etc.), the execution of firmware with hardware, or the execution of software and firmware with hardware.

Figure 4:
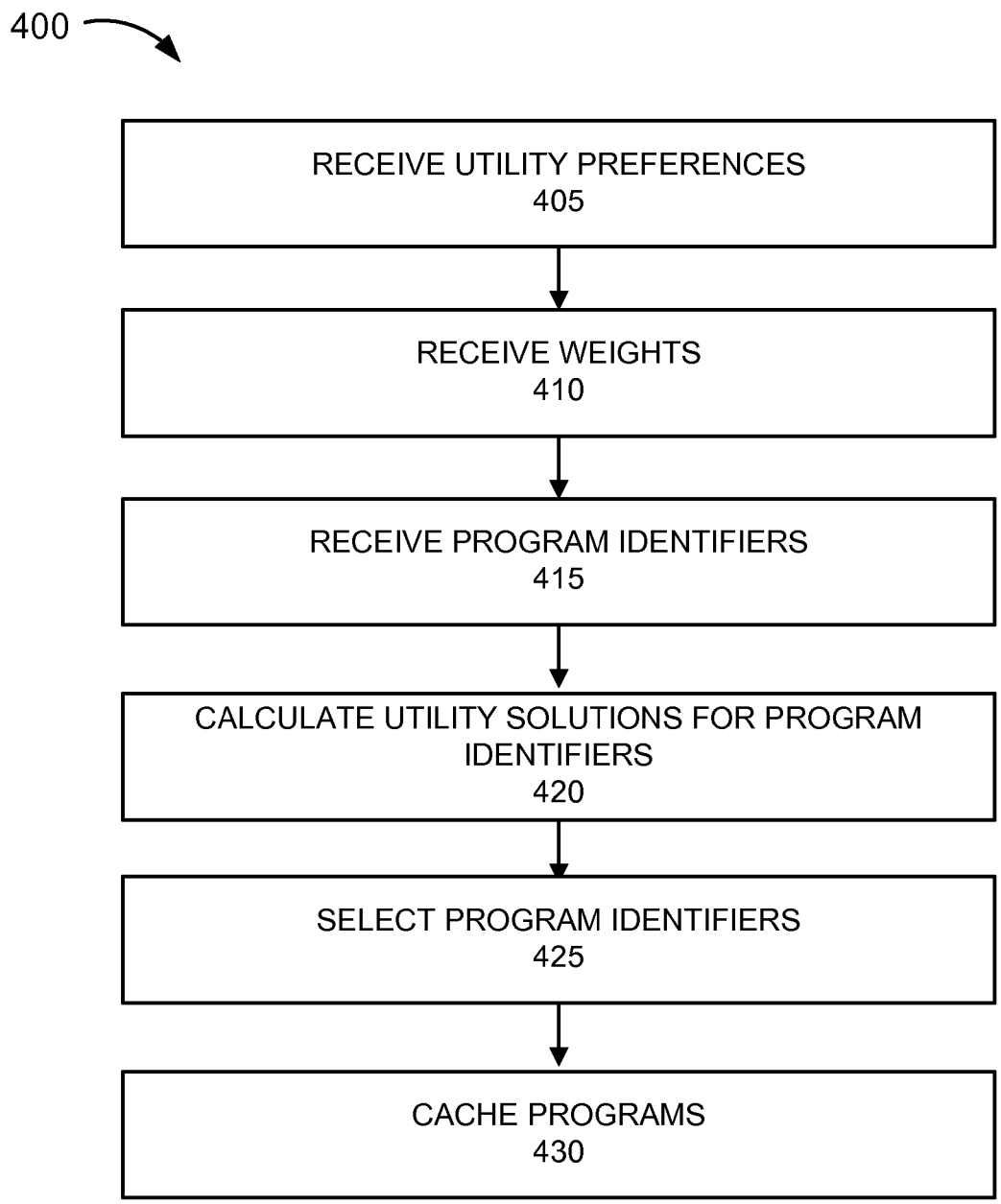
FIG. 4 is a flow diagram for managing the caching of programs based on the utility model described herein.

FIG. 4 is a flow diagram for managing the caching of programs based on the utility model described herein. According to an exemplary embodiment, edge server controller 115 or edge server 125 performs one or more of the steps described in process 400. For example, processor 305 may execute software 315 to perform the steps described.

Process 400 begins by a utility preference being received (block 405). For example, one or multiple utility preferences are received. As previously described, there are numerous types of utility preferences $U(Q_i)$ that may be used, such as, for example, past viewing history, particular categories of programs, particular programs (e.g., selected based on the season, holiday, current events, etc.), bitrates pertaining to the programs, time (e.g., time of day, day in week, etc.), cache as many different programs as possible, length of programs, location of edge server, caching on multiple edge servers, caching programs similar to popular programs, caching programs based on what is currently playing at the movie theaters, a percentage of the program that needs to be cached, only recent or new programs, combinations thereof, etc. According to an exemplary implementation and depending on the utility preference, one or multiple values may be received pertaining to the utility preference.

In block 410, a weight is received for each utility preference. For example, each utility preference is assigned a weight $w_i$. According to an exemplary implementation, $w_i$ may be normalized as $$\sum_{i=1}^{n} w_i = 1,$$

such that the value for each $w_i$ is between 0 and 1. According to another implementation, other values for $w_i$ may be used.

In block 415, program identifiers associated with programs to be downloaded and/or streamed are received. For example, a string (e.g., an alphanumeric string, a numeric string, etc.) may be used to identify a program. The program identifiers pertain to a set of programs in which utility solutions may be calculated. Additionally, other types of information may be received, such as metadata. As an example, if a utility preference pertains to whether the program is of a certain genre, then the metadata pertaining to the programs may be used to determine the genre of the programs.

In block 420, utility solutions for the program identifiers are calculated. For example, the overall utility U is calculated for the program identifiers based on the utility equation (1). According to an exemplary implementation, as previously described, a heuristic may be used to, for example, reduce the search space/time problem. For example, well-known techniques commonly used for constraint satisfaction problem solving may be applied.

In block 425, program identifiers are selected based on the utility solutions. For example, the utility solutions are compared. The utility solutions having a higher utility score than other utility solutions are selected. The program identifiers associated with the selected utility solutions are selected for caching.

In block 430, the selected programs are cached. For example, the selected programs are cached on edge servers 125. In some cases, the programs may already be cached on edge servers. According to such cases, the programs remain cached.

Although FIG. 4 illustrates an exemplary process 400 for managing the caching of programs, according to other embodiments, process 400 may include additional operations, fewer operations, and/or different operations than those illustrated in FIG. 4 and described herein. For example, hard constraint information may be received. The selection of programs to be cached may be based on the hard constraint information. For example, if caching one or more of the selected programs would cause a violation of the hard constraint information, then these programs would not be cached. As an example, a storage limitation associated with edge server 125 may prevent one or more programs from being cached. Additionally or alternatively, according to an exemplary implementation, weights $w_i$ may not be used. For example, a value resulting from a utility preference $U(Q_i)$ applied to a program may be used to calculate the overall utility score U.

The foregoing description of embodiments provides illustration, but is not intended to be exhaustive or to limit the embodiments to the precise form disclosed. Accordingly, modifications to the embodiments described herein may be possible.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items.

In addition, while a series of blocks has been described with regard to the process illustrated in FIG. 4, the order of the blocks may be modified according to other embodiments. Further, non-dependent blocks may be performed in parallel. Additionally, other processes described in this description may be modified and/or non-dependent operations may be performed in parallel.

The embodiments described herein may be implemented in many different forms of software, firmware, and/or hardware. For example, a process or a function may be implemented as "logic" or as a "component." This logic or this component may include hardware (e.g., processor 305, etc.), a combination of hardware and software (e.g., software 315), a combination of hardware and firmware, or a combination of hardware, firmware, and software. The embodiments have been described without reference to the specific software code since software can be designed to implement the embodiments based on the description herein.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded as illustrative rather than restrictive.

In the specification and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

No element, act, or instruction described in the present application should be construed as critical or essential to the embodiments described herein unless explicitly described as such.

What is claimed is:

1. A method comprising:
    receiving, by a network device, utility preferences that indicate criteria for measuring one or more utilities of programs;
    storing hard constraint information, wherein the hard constraint information includes one or more hard resource constraints pertaining to one or more resources of the network device and one or more hard program constraints pertaining to the programs;
    receiving weights pertaining to the utility preferences;
    identifying a value of at least one of the weights, which pertains to at least one of the utility preferences, as being higher in value relative to another value of the weights, which pertains to another one of the utility preferences;
    pre-sorting candidate programs that rank higher relative to other programs with respect to the at least one of the utility preferences based on an identification of the value;
    calculating, by the network device, utility solutions for at least a portion of pre-sorted candidate programs based on the utility preferences and the hard constraint information, wherein the calculating comprises:
        selecting one or more programs, which are top-ranked, in relation to each of the utility preferences;
        combining the selected one or more programs from each of the utility preferences; and applying the weights of the utility preferences in relation to a combined set of programs;

selecting, by the network device, one or more programs to store for at least one of downloading or streaming based on the utility solutions; and storing the one or more programs.

2. The method of claim 1, further comprising:

storing soft constraint information; and calculating the utility solutions based on the soft constraint information.

3. The method of claim 1, further comprising:

collecting statistical information pertaining to the programs, and wherein the calculating comprises:

calculating the utility solutions based on the statistical information.

4. The method of claim 1, wherein the utility preferences include at least one of previous access history pertaining to the programs or bitrates of the programs, and the method further comprising:

storing user preference information pertaining to users that at least one of download or stream programs, wherein the calculating further comprises:

calculating the utility solutions for the programs based on the utility preferences, the hard constraint information, and the user preference information.

5. The method of claim 1, wherein the one or more hard resource constraints pertain to storage space, bandwidth, or a processor limitation, and the one or more hard program constraints are based on a popularity of the programs, wherein the popularity is not based on previous access of the programs.

6. The method of claim 1, further comprising:

transmitting, to another device, an update program request that identifies the programs to be stored, and wherein at least one of the utility preferences include upper bound and lower bound values, the method further comprising:

using the upper bound and the lower bound values to calculate one of the utility solutions, wherein the one of the utility solutions is normalized based on the upper bound and the lower bound values.

7. The method of claim 1, wherein the calculating comprises:

applying one or more heuristics that reduce a time constraint and a search space constraint for selecting the one or more programs.

8. A device comprising:

a communication interface;

one or more memories that store instructions; and one or more processors to execute the instructions to:

receive utility preferences that indicate criteria for measuring one or more utilities of programs;

store hard constraint information, wherein the hard constraint information includes one or more hard resource constraints pertaining to one or more resources of the device and one or more hard program constraints pertaining to the programs;

receive weights pertaining to the utility preferences;

identify a value of at least one of the weights, which pertains to at least one of the utility preferences, as being higher in value relative to another value of the weights, which pertains to another one of the utility preferences;

pre-sort candidate programs that rank higher relative to other programs with respect to the at least one of the utility preferences based on an identification of the value;

calculate utility solutions for at least a portion of pre-sorted candidate programs based on the utility preferences and the hard constraint information, wherein a calculation comprises:

select one or more programs, which are top-ranked, in relation to each of the utility preferences;

combine the selected one or more programs from each of the utility preferences;

apply the weights of the utility preferences in relation to a combined set of programs; and select one or more programs to store for at least one of downloading or streaming based on the utility solutions.

9. The device of claim 8, wherein the one or more processors further execute the instructions to:

store soft constraint information; and calculate the utility solutions based on the soft constraint information.

10. The device of claim 8, wherein the one or more processors further execute the instructions to:

determine whether the programs will cause a violation of a constraint indicated by the hard constraint information; and remove any of the programs in response to a determination that any of the programs will cause the violation of the constraint indicated by the hard constraint information.

11. The device of claim 8, wherein the one or more processors further execute the instructions to:

receive statistical information pertaining to the programs, and wherein when calculating, the one or more processors further execute the instructions to:

calculate the utility solutions based on the statistical information.

12. The device of claim 8, wherein the one or more processors further execute the instructions to:

transmit a message to another device that stores the one or more programs, wherein the message indicates the selected one or more programs.

13. The device of claim 8, wherein the one or more processors further execute the instructions to:

store the one or more programs;

receive user requests for the at least one of downloading or streaming of programs; and download or stream programs to users in response to the user requests.

14. The device of claim 8, wherein the one or more processors further execute the instructions to:

store user preference information pertaining to users that at least one of download or stream programs, and wherein when selecting the one or more programs, the one or more processors further execute the instructions to:

select the one or more programs based on the user preference information.

15. The device of claim 8, wherein the device includes an edge server of a content delivery network or an edge server controller of a content delivery network.

16. A non-transitory storage medium storing instructions executable by a computational device to:

receive utility preferences that indicate criteria for measuring one or more utilities of programs;

store hard constraint information, wherein the hard constraint information includes one or more hard resource constraints pertaining to one or more resources of the computational device and one or more hard program constraints pertaining to the programs;

receive weights pertaining to the utility preferences;

identify a value of at least one of the weights, which pertains to at least one of the utility preferences, as being higher in value relative to another value of the weights, which pertains to another one of the utility preferences;

pre-sort candidate programs that rank higher relative to other programs with respect to the at least one of the utility preferences based on an identification of the value;

calculate a utility solution for at least a portion of pre-sorted candidate programs based on the utility preferences and the hard constraint information, wherein a calculation comprises:
  select one or more programs, which are top-ranked, in relation to each of the utility preferences;
  combine the selected one or more programs from each of the one or more utility preferences; and
  apply the weights of the utility preferences in relation to a combined set of programs;

compare calculated utility solutions;

determine a set of programs having a higher utility relative to other programs in response to comparisons; and select one or more programs to store for at least one of downloading or streaming based on the utility solutions.

17. The non-transitory storage medium of claim 16, further storing instructions executable by the computational device to:
  store soft constraint information; and
  calculate the utility solutions based on the soft constraint information.

18. The non-transitory storage medium of claim 16, wherein the one or more hard program constraints include a constraint that a particular program must be stored for a particular time period and will not be removed or swapped out regardless of other conditions.

19. The non-transitory storage medium of claim 16, further storing instructions executable by the computational device to:
  select the one or more programs based on user preference information pertaining to users that at least one of download or stream programs.

20. The non-transitory storage medium of claim 16, further storing instructions executable by the computational device to:
  update programs stored based on the selected one or more programs.

* * * * *